United States Patent [19]

Hildebrecht

[11] 4,295,540
[45] Oct. 20, 1981

[54] VEHICLE BRAKE AND ENGINE INTERLOCK

[75] Inventor: Harold V. Hildebrecht, Cleveland, Ohio

[73] Assignee: Towmotor Corporation, Mentor, Ohio

[21] Appl. No.: 117,581

[22] PCT Filed: Sep. 14, 1979

[86] PCT No.: PCT/US79/00725
§ 371 Date: Sep. 14, 1979
§ 102(e) Date: Sep. 14, 1979

[87] PCT Pub. No.: WO81/00696
PCT Pub. Date: Mar. 19, 1981

[51] Int. Cl.³ ............................................. B60K 28/00
[52] U.S. Cl. ................................ 180/271; 123/179 K; 123/198 D; 192/0.09
[58] Field of Search ............... 180/287, 272, 271, 285; 192/0.09, 4 A; 74/477; 123/179 K, 198 DB, 198 D, 198 R; 307/10 R; 340/69, 53

[56] References Cited
U.S. PATENT DOCUMENTS

| | | | |
|---|---|---|---|
| 3,608,285 | 9/1971 | Berk | 180/271 |
| 3,626,919 | 12/1971 | MacMillan | 123/198 DB |
| 3,722,492 | 3/1973 | Shibata | 123/198 R |
| 4,033,311 | 7/1977 | Burson | 180/271 |
| 4,051,915 | 10/1977 | Behrens | 180/271 |
| 4,136,329 | 1/1979 | Trobert | 340/53 |

*Primary Examiner*—David M. Mitchell
*Attorney, Agent, or Firm*—Phillips, Moore, Weissenberger, Lempio & Majestic

[57] ABSTRACT

Brake wear in a vehicle (11, 11a) may be reduced by an interlock (23, 23a) which blocks delivery of power to the wheels (13, 13a) or the like if an attempt is made to initiate powered travel while the parking brake (19, 19a) remains engaged. Rather than neutralizing the vehicle transmission (16, 16a), the interlock (23, 23a) responds to an engaged parking brake (19, 19a) accompanied by drive transmitting conditions in the clutch (18, 18a) and transmission (16, 16a) by suppressing power output at the engine (12, 12a). In one form the system overrides the operator's controls to limit fuel input to the engine (12) so that stalling occurs if start-up is attempted with the brake (19) engaged while in another form the system directly shuts down the engine (12a) under such conditions. Start-up of the vehicle (11, 11a) on a slope or under load is facilitated as the engine (12, 12a) may be accelerated while the transmission (16, 16a) is in gear and the brake (19, 19a) is still engaged. Use of the parking brake (19, 19a) for emergency stopping is facilitated as the retarding action of the engine (12, 12a) remains available to supplement such use of the parking brake (19, 19a).

14 Claims, 3 Drawing Figures

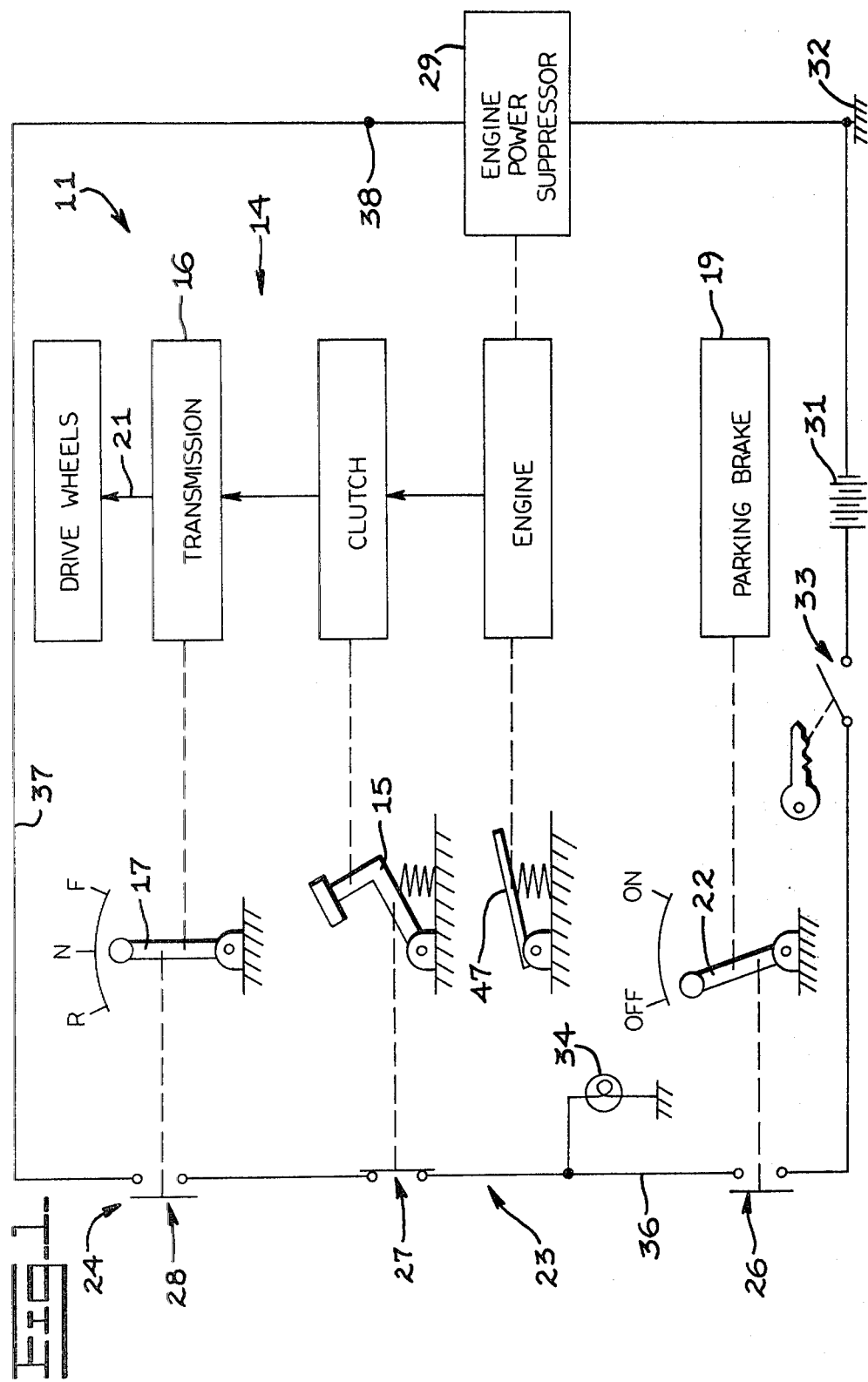

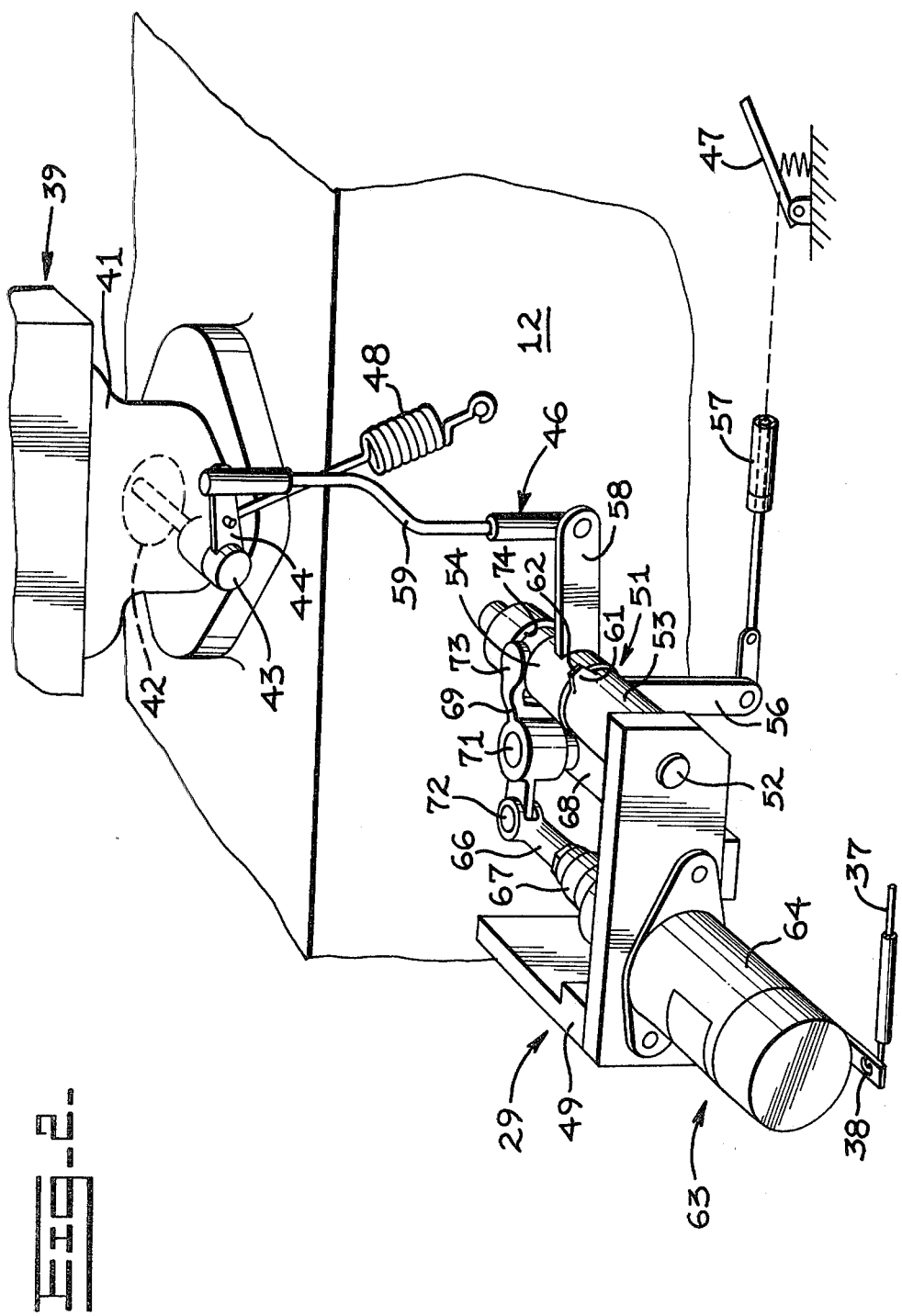

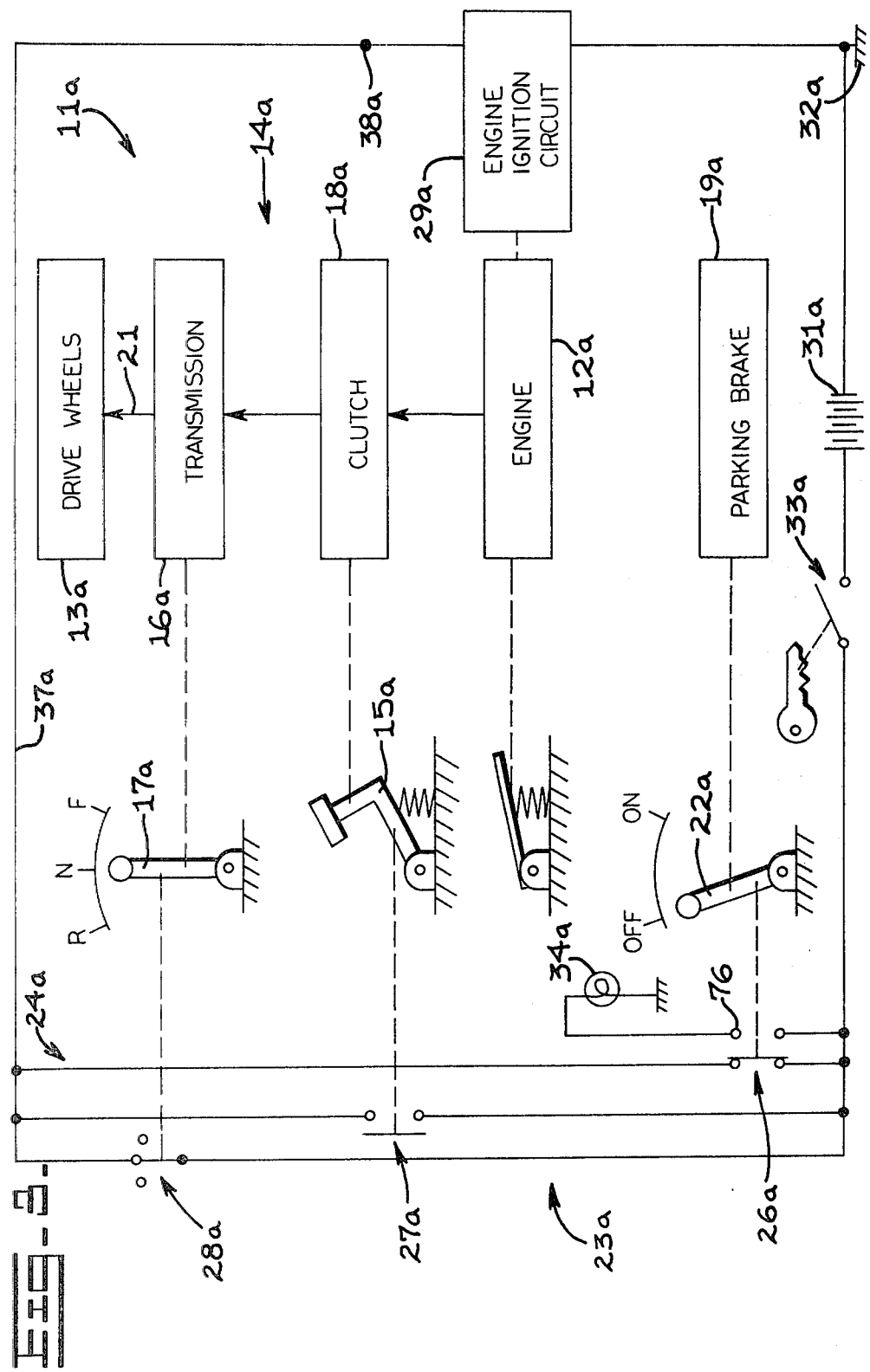

VEHICLE BRAKE AND ENGINE INTERLOCK

TECHNICAL FIELD

This invention relates to brake systems for engine driven vehicles and more particularly to interlocks which prevent initiation of powered travel of the vehicle unless the parking brake or the like is disengaged.

BACKGROUND ART

Brakes designed for the purpose of immobilizing a parked vehicle usually wear very rapidly if the brake is engaged during powered travel of the vehicle. In the absence of protective interlock systems, unnecessary brake wear of this kind most commonly occurs at start-up as operators may on occasion forget to release the brake when powered travel is being initiated.

A variety of interlock systems have heretofore been used to prevent "drive through" or start-ups of a vehicle with the parking brake engaged. Prior interlocks variously employ electromechanical, fluidic or mechanical linkage means to sense the condition of the brake and to actuate a means for blocking the flow of power between the engine and the drive wheels or the like while the brake remains engaged. More specifically, prior interlocks typically act to maintain or establish a neutral condition in the vehicle transmission until the parking brake is released.

While being effective for the basic purpose of preventing drive through, such prior interlocks have the further effect of restricting certain modes of vehicle operation which can be desirable under some conditions.

Automatic neutralization of the transmission when the brake is engaged may, for example, complicate the start-up process if the vehicle is on a slope or under heavy load. In some cases, interlocks which hold the transmission in neutral if the brake is engaged do not allow the engine to be accelerated with the transmission already in gear, prior to release of the parking brake, as is desirable to facilitate start-up under such conditions. Further, while it is not desirable to use the parking brake to slow or stop the traveling vehicle under most conditions, this can become necessary on occasion because of malfunction of the primary or service brakes. Where the parking brake is used in an emergency situation of this kind, many of the above discussed prior interlock systems force the transmission into neutral simultaneously with application of the parking brake. Consequently, the retarding action or dynamic braking effect of the engine is not available to supplement the parking brake in slowing or stopping the vehicle.

Depending on the nature of the specific interlock and vehicle drive system, there are often still other effects which tend to limit operational flexibility of the vehicle under various different operating conditions.

Certain problems involved in using known forms of interlock system tend to be most pronounced in vehicles which employ a so-called mechanical or manually shifted gear box type of transmission connected in tandem with a manually operated drive clutch. Forcing of a neutral condition, when the parking brake is engaged, is a relatively simple matter in transmissions of the fluid pressure controlled or power shift type which includes many planetary transmissions. These are commonly provided with a neutralizing signal port and the interlock system may simply transmit a pressure signal to the port to achieve the desired neutral condition.

This is not possible in most mechanical transmissions. Where prior brake interlock systems are used with manual transmissions, it has been necessary to provide complex mechanical linkages to lock the operator's shift lever in a neutral setting or in some cases to provide power actuators to force the shift lever or linkage back to the neutral position in opposition to the operator's efforts.

In general prior brake interlock systems accomplish the desired objective of preventing drive through only at the cost of introducing other less objectionable complications into the structure or operation of the vehicle or both.

DISCLOSURE OF INVENTION

The present invention is directed to overcoming one or more of the problems as set forth above.

In one aspect of this invention, a brake protection interlock system is provided for a vehicle which has ground engaging means, a brake, an engine and drive delivering means for transmitting power from the engine to the ground engaging means in which the drive delivery means has both a drive transmitting condition and a nondrive transmitting condition. The interlock system suppresses power output from the engine if the drive delivering means is in the drive transmitting condition at the same time that the brake is engaged.

In one form of the invention, the interlock decreases power output of the engine to the point where stalling occurs if start-up or drive through is attempted with the brake engaged. In another form of the invention, the interlock directly shuts down the engine under similar conditions.

In a specific form of the invention adapted for use in a vehicle having a manual transmission, shiftable from a neutral setting to at least one drive transmitting setting and which is coupled in tandem with a clutch, the interlock detects when the brake is engaged and also when the clutch is engaged and also if the transmission is in a drive transmitting setting and suppresses power production by the engine only if all three of these conditions are present simultaneously.

The invention avoids the hereinbefore discussed problems of prior brake interlocks in part by acting to inhibit power production at the vehicle engine, when drive through conditions are present, rather than by forcing a neutral condition in the transmission under those circumstances. Consequently, the interlock does not interfere with realization of desirable transmission functions at times when the brake is engaged. For example, start-up of the vehicle on a slope or under load is facilitated as the engine may be accelerated with the transmission already in gear while the parking brake remains engaged. Further, the retarding or dynamic braking effect of the engine remains available if it becomes necessary to use the parking brake for emergency slowing or stopping of the vehicle after powered travel is underway.

The advantageous results of the invention may be realized without significant structural complications in the transmission or the transmission controls including in vehicles which have manually shifted mechanical transmissions that lack any nonmanual neutralization means.

BRIEF DESCRIPTION OF DRAWINGS

FIG. 1 is a circuit diagram depicting a first embodiment of the present invention.

FIG. 2 is a perspective view of a portion of an engine of the type having a carburetor and depicts one suitable construction for a power output suppressor means which may be employed in the embodiment of FIG. 1, and FIG. 3 schematically depicts a second embodiment of the invention which interacts with the engine ignition circuit.

BEST MODES FOR CARRYING OUT THE INVENTION

Referring initially to FIG. 1, certain components of a vehicle 11 are depicted only in schematic form as such components may have known detailed constructions. The vehicle 11 includes an engine 12, ground engaging means such as road wheels 13 or the like and a drive delivery means 14 for selectively transmitting power from the engine to the wheels.

Drive delivery means 14 has a transmission 16 which, in this particular example, is manually shiftable from a neutral mode of operation to either a forward drive mode or a reverse drive mode by positioning of an operator's shift lever 17, the invention also being adaptable to other types of drive system. Drive delivery means 14 in this example also has a drive clutch 18, coupling engine 12 and transmission 16, which may be shifted from a normally engaged to a disengaged condition by depression of an operator's clutch pedal 15. With clutch 18 engaged and transmission 16 in forward or reverse, means 14 is in a drive transmitting condition. If clutch 18 is disengaged or transmission 16 is in neutral, or both, a nondrive transmitting condition is established.

Vehicle 11 also has a parking brake 19 which may be situated at the wheels 13 or the drive shaft 21 or elsewhere depending on the type of vehicle. Brake 19 is selectively shiftable between a disengaged or off position and an engaged or on position by manipulation of an operator's brake control lever 22.

An interlock system 23 interacts with the brake lever 22, clutch pedal 19 and shift lever 17 to prevent an initiation of powered travel of the vehicle if the parking brake 19 remains engaged. The interlock 23 includes an engine inhibit signal generating sensor means 24 for detecting the condition of parking brake 19 and that of clutch 18 and also that of transmission 16 in order to generate a signal if the parking brake is engaged at the same time that the clutch and transmission are both conditioned to deliver power from the engine 12 to the wheels 13. In this example, the sensor means 24 includes a brake condition sensor switch 26, a clutch condition sensor switch 27, and a transmission condition sensor switch 28. Brake sensor switch 26 in this particular embodiment is coupled to brake lever 22 to be opened when the brake lever is positioned in the brake disengaged or off position and to be closed when the brake lever is shifted to the brake engaged or brake on position. Clutch sensor switch 27 in this embodiment is coupled to clutch pedal 15 to be closed when the clutch pedal is released and thus when the clutch 18 is engaged and to be opened when the clutch pedal is depressed and the clutch is disengaged. Transmission sensor switch 28 in this embodiment is coupled to the shift lever 17 to be open when the shift lever is positioned at the neutral setting and to be closed when the shift lever is at either of the forward drive or reverse drive settings.

As is apparent, the several sensor switches 26, 27 and 28 need not necessarily be coupled directly to the brake lever 22, clutch pedal 15 and transmission shift lever 17 respectively but may instead be coupled to internal components of the parking brake 19, clutch 18 and transmission 16 or to control linkages which connect such elements and the control levers and pedal. Where fluid pressure actuated controls are present, pressure sensitive sensor switches may be used.

Simultaneous closure of each of the sensor switches 26, 27 and 28 generates an engine inhibit signal which actuates engine power suppressor means 29 for suppressing the power output of engine 12. In this embodiment, means 29 does not directly stop the engine but, as will hereinafter be described in more detail, reduces the fuel input to a point that stalling of the vehicle as a whole will occur if an attempt is made to initiate powered travel with the brake 19 engaged. In another embodiment to be hereinafter described, the corresponding means 29 directly and immediately shuts down the engine. Thus the term engine power suppressor should be understood to refer to either means which limits power output to the point where the stalling will occur if power travel is attempted with an engaged brake or alternately to means which shut down the engine, examples of both being hereinafter described.

To actuate the engine power suppressor means 29 under the above described conditions, sensor switches 26, 27 and 28 and the power suppressor means 29 are connected in electrical series relationship with a source of electrical energy which may typically be the vehicle battery 31. One terminal of battery 31 and one terminal of the power suppressor means 29 may be connected to a chassis ground 32 normally defined by the metal frame of the vehicle. Preferably the electrical connection from the other terminal of battery 31 to the signal input terminal 38 of power suppressor means 29 through the three sensor switches 26, 27 and 28 includes the vehicle start or ignition switch 33 to assure that the interlock system 23 is de-energized when the vehicle is parked and not being used. An indicator lamp 34 is connected between chassis ground 32 and the conductor 36 which connects brake sensor switch 26 with clutch sensor switch 27 in order to provide the operator with a visual indication of an engaged condition of the brake.

Thus the sensor means 24 transmits an engine inhibit signal to engine power suppressor means 29 if both the parking brake 19 and drive clutch 18 are engaged while the transmission 16 is in a drive transmitting mode, the signal in this example being in the form of an electrical voltage which appears on the output conductor 37 of transmission sensor switch 28 and which is transmitted by conductor 37 to input terminal 38 of power suppressor means 29. The engine power suppressor means 29 may be any device capable of restricting engine output power or capable of stopping engine operation in response to an input signal. FIG. 2 illustrates one example of an engine power suppressor means 29 of the first type suitable for vehicle having an engine 12 in which the fuel input means 39 includes a carburetor 41 and which is also adaptable to governor controlled diesel engines.

Referring to FIG. 2, the engine 12 and carburetor 41 may be of known constructions and thus will not be described in detail except to note that carburetors have an internal throttle valve 42 which is adjustable to regulate the rate of fuel input to the engine and which thereby regulates power output. Throttle valve 42 is typically supported on a rotatable shaft 43 having a short crank arm 44 at the outer end to which throttle linkage 46 is coupled to enable the operator to adjust the position of throttle valve 42 by manipulation of a control such as by selectively depressing an accelerator pedal 47. The carburetor is also equipped with a spring 48 or the like, connected between crank arm 44 and an adjacent portion of engine 12 in this example, which biases the throttle valve 42 towards the minimum fuel input or idle setting.

Engine power suppressor means 29 in this example in part constitutes an element of the throttle control linkage 46. More specifically, a bracket 49 is secured to engine 12 and supports disconnect means 51 for disconnecting the accelerator pedal 47 from the throttle valve 42 of the carburetor under certain conditions to be described. Disconnect means 51 includes an axle pin 52 supported by bracket 49 and extending, in this particular example of the invention, in a direction parallel to that of the throttle valve support shaft 43 of the carburetor. First and second annular disconnect elements 53 and 54 respectively are disposed coaxially on axle pin 52. First disconnect element 53 has a crank arm 56 which is coupled to accelerator pedal 47 through a sheathed cable 57 so that depression of the accelerator pedal pivots crank arm 56 and thereby turns first disconnect element 53 on axle pin 52. The second disconnect element 54 also has a crank arm 58 which is coupled to the carburetor crank arm 44 through a link 59.

First disconnect element 53 has a tongue 61 extending a short distance axially from the end of the element and which enters into and engages a matching groove 62 on the adjacent end surface of the second disconnect element 54. Thus if the second disconnect element 54 is moved axially on axle pin 52 into abutment with first disconnect element 53, tongue 61 may enter groove 62 to constrain the two disconnect elements to turn jointly on axle pin 52. If the second disconnect element 54 is moved axially away from the first disconnect element 53 tongue 61 disengages from groove 62 at which point rotary motion is no longer transmitted between the two elements. When the disconnect elements 53 and 54 are separated in this manner, throttle valve 42 of the carburetor is decoupled from accelerator pedal 47 and under such circumstances spring 48 returns the throttle valve to the minimum fuel input or idle setting without regard to the position of the accelerator pedal.

To control the disconnect means 51, a solenoid actuator 63 has a coil 64 secured to mounting bracket 49, the axis of the coil in this instance being parallel to axle pin 52. Solenoid actuator 63 may be of the known construction having an armature 66 extending from one end and which is normally biased outwardly from the coil by a spring 67 but which is magnetically drawn further into the coil against the action of the spring when an electrical current is applied to input terminal 38. The solenoid input terminal 38 in this example is the previously described engine power suppressor input terminal to which the previously described inhibit signal conductor 37 is connected.

A mounting member 68 is secured to bracket 49 and extends between solenoid armature 66 and axle pin 52 to support a disconnect control lever 69. The central portion of lever 69 attaches to support member 68 through a pivot pin 71 having a pivot axis orthogonal to the axle pin 52 and solenoid armature 67. One end of lever 69 is coupled to the end of solenoid armature 66 through another pivot pin 72 having a pivot axis parallel to that of pivot pin 71 and the other end of the lever is bifurcated to form a fork 73 which engages an annular groove 74 on second disconnect element 54. Thus retraction of armature 66 upon energization of the solenoid actuator 63 in response to an electrical current at solenoid terminal 38 pivots lever 69 to draw the second disconnect element 54 axially away from the first disconnect element 53 and thereby disconnects the carburetor throttle valve 42 from accelerator pedal 47.

Industrial Applicability of the Embodiment of FIGS. 1 and 2

In operation, with reference to FIG. 1 in particular, vehicle 11 may be operated in the normal manner by manipulation of the several vehicle controls which include, among others, the ignition and start switch 33, the parking brake lever 22, clutch pedal 15, transmission shift lever 17 and accelerator pedal 47. After the ignition switch 33 is closed and the engine 12 is operating, the operator normally starts up or initiates powered travel of the vehicle by depressing clutch pedal 15, moving shift lever 17 out of the neutral setting and into a drive transmitting setting and then releasing the clutch pedal which depressing the accelerator pedal 47. Under normal operating conditions, the brake lever 22 is shifted to the off or disengaged position prior to the above described operations or if the vehicle is stopped on a slope, the brake is released concurrently with the release of the clutch pedal. Provided that start-up of the vehicle proceeds in this normal manner the interlock 23 remains effectively inactive and does not affect operation of the vehicle. But if the operator should fail to disengage the parking brake 19 but otherwise proceed through the above described steps for initiating powered travel of the vehicle, then a condition is created under which all three of the sensor switches 26, 27 and 28 are closed and current from battery 31 is transmitted to input terminal 38 of engine power suppressor means 29 which then limits the power output of engine 12 by decoupling accelerator pedal 47 from the engine. More specifically, with reference to FIG. 2, receipt of electrical current at input terminal 38 causes armature 66 to retract into coil 64 thereby pivoting lever 69 which moves the second disconnect element 54 axially on pin 52 to disengage tongue 61 from groove 62. Spring 48 then holds the throttle valve 42 at the idle setting or restores the throttle valve to the idle setting without regard to the position of the accelerator 47 and associated linkage elements 56 and 57 as such elements are now disconnected from the remaining elements 58 and 59 of the carburetor control linkage 46. With the carburetor 41 at the idle setting, and as the parking brake 19 is still engaged, the attempt at initiating powered travel of the vehicle then results in stalling of the engine 12. The power output of the engine 12 at idle is insufficient to overcome the resistance of the brake 19 and accelerate the vehicle.

After stalling of the vehicle has occurred as a result of an attempt to start-up with the parking brake engaged, any single one of three actions by the operator or any combination of such actions terminates the inhibit signal to actuator 63. Referring to FIG. 1, these three actions are release of the parking brake 19, disengagement of the drive clutch 18 and shifting of the transmission 16 to neutral, any one of which actions opens the electrical circuit from battery 31 to power suppressor means 29.

Referring to FIG. 2, when the power suppressor means solenoid 63 is deenergized in this manner, spring 67 extends armature 66 outward from coil 64. The armature movement acting through lever 69 moves the second disconnect element 54 back into abutment with the first disconnect element 53 and at such time as the accelerator pedal 47 is released, tongue 61 reengages in groove 62 and the mechanism is reconditioned for another attempt at start-up. Stalling of the engine 12 will again occur for the reasons described above unless the operator releases the parking brake 19 prior to completing the other operations which establish a power delivering condition in the power delivering means 14 between engine 12 and wheels 13.

The interlock 23 does not prevent the operator from accelerating engine 12 with the transmission 16 in gear and with the parking brake 19 still engaged as is desirable to facilitate a start-up on a slope or under heavy load since the clutch pedal 15 is depressed at that time. This holds switch 27 open and thereby prevents the interlock from suppressing engine output. Release of the parking brake 19 need only occur just prior to engaging drive clutch 18 by release of clutch pedal 15.

In contrast to prior interlocks which neutralize the vehicle transmission when the parking brake is engaged, interlock 23 does not decouple wheels 13 from engine 12 if it becomes necessary to use the parking brake 19 for emergency slowing or stopping after powered travel of the vehicle is underway. Although the interlock 23 is actuated at that time by the simultaneous closure of sensor switches 26, 27 and 28, the engine nevertheless remains coupled to the wheels 13 through the drive clutch 18 and transmission 16 and thus exerts a desirable retarding action on vehicle motion to supplement the emergency use of the parking brake 19.

Although the interlock was originally designed for usage on an industrial fork lift truck, the invention is equally applicable to diverse other forms of powered vehicle.

Alternate Embodiment of FIG. 3

Modifications of the invention are readily possible, one example of which is depicted in FIG. 3. The vehicle 11a of FIG. 3 may be similar to that of the previous embodiment and thus may have an engine 12a coupled to ground engaging means such as drive wheel 13a through a drive clutch 18a and transmission 16a, the drive clutch and transmission jointly constituting a drive delivery means 14a. As in the previous instance, parking brake 19a may be engagable and disengagable by manipulation of an operator's brake lever 22a, clutch 18a may be disengagable by depression of an operator's clutch pedal 15a and transmission 16a may be shiftable from a neutral mode to one or more drive transmitting modes by movement of an operator's shift lever 17a.

This embodiment differs from that previously described, in part by the nature of the engine power suppressor means 29a which in this example is the engine ignition circuit. Provided that the ignition switch 33a has been closed, electrical voltage from vehicle battery 31a is supplied to the input terminal 38a of the engine ignition circuit 29a through a modified interlock 23a and output conductor 37a. In this embodiment engine 12a is shut down, if an attempt is made to initiate powered travel with an engaged parking brake, by disconnecting the ignition circuit 29a from battery 31a. For this purpose the three sensor switches 26a, 27a and 28a which are respectively coupled to the brake lever 22a, clutch pedal 15a and shift lever 17a are connected in parallel relationship between ignition switch 33a and inhibit signal conductor 37a instead of being in series relationship as in the previous example.

The normal or unactuated position of each of the three sensor switches 26a, 27a, 28a is also the reverse of that found in the previously described embodiment. More particularly, brake sensor switch 26a is closed when the brake 19a is disengaged and opened when the brake is engaged or on. Clutch sensor switch 27a is open when the drive clutch 18a is engaged and is closed by depression of the clutch pedal 15a to disengage the clutch. Transmission sensor switch 28a is closed when the transmission is in the neutral mode of operation and is opened when the transmission shift lever 17a is shifted away from the neutral position towards either the forward or reverse drive positions. Brake indicator lamp 34a in this example is connected between the output side of ignition switch 33a and chassis ground 32a through a second set of contacts 76 of brake sensor switch 26a, the second set of contacts 76 being open when the brake 19a is disengaged and being closed, to light the indicator lamp when the brake is engaged.

Industrial Applicability of the Embodiment of FIG. 3

In operation, a normal start-up of the vehicle 11a is initiated by depressing clutch pedal 15a and closing the ignition switch 33a. As the depression of the clutch pedal 15a closes clutch sensor switch 27a, voltage is supplied to the engine ignition circuit 29a through that switch irrespective of the position of the brake sensor switch 26a or transmission sensor switch 28a and starting of the engine may proceed. Start-up of the engine 12a may also proceed, without regard to the position of the clutch pedal 15a, if brake 19a is disengaged as switch 26a is then closed to provide voltage to the ignition circuit. Starting of the engine 12a may also proceed if the transmission 16a is in neutral as switch 28a is then closed to provide the ignition voltage.

After starting of the engine 12a, actual powered travel of the vehicle 11a cannot be initiated if the brake 19a remains engaged at the time that drive transmitting conditions are established through both of clutch 18a and transmission 16a. Under that condition, all three switches 26a, 27a and 28a are open thereby interrupting the connection between battery 31a and ignition circuit 29a and shutting down the engine 12a.

Thus, as in the previously described embodiment, powered travel of the vehicle 11a cannot be commenced until after parking brake 19a is released. However, the parking brake 19a may be applied after powered travel is underway without decoupling the engine 12a from drive wheels 13a. Although this shuts down the engine, the engine still exerts a desirable retarding effect. Similarly, engine 12a may be started with the brake 19a on and transmission 16a already in gear since depression of clutch pedal 15a at that time closes sensor switch 27a to provide a conducting path from ignition switch 33a to the ignition circuit 29a.

While the embodiments of the invention described above use electrical sensor switches and electrically controlled power suppressor means, equivalent fluid circuit elements may also be utilized.

Other aspects, objects and advantages of this invention can be obtained from a study of the drawings, the disclosure and the appended claims.

I claim:

1. In a brake protection interlock system (23, 23a) for a vehicle (11, 11a) having ground engaging means (13, 13a), a brake (19, 19a), an engine (12, 12a), and drive delivery means (14, 14a) for transmitting power from said engine (12, 12a) to said ground engaging means (13, 13a), said drive delivery means (14, 14a) having a transmission (16, 16a) with at least one nondrive transmitting condition and at least one drive transmitting condition and having a clutch (18, 18a) which may be engaged and disengaged, and including first means (29, 29a) for preventing initiation of powered travel of said vehicle (11, 11a) with said brake (19, 19a) engaged by suppressing power output from said engine (12, 12a), the improvement comprising:

second means (28, 28a) for causing said first means (29, 29a) to suppress power output from said engine (12, 12a) in response to said transmission (16, 16a) being in said drive transmitting condition while both of said brake (19, 19a) and said clutch (18, 18a) are engaged, and third means (27, 27a) for enabling starting of said engine (12, 12a) with said transmission (16, 16a) in drive transmitting condition while said brake (19, 19a) is engaged by inactivating said second means (28, 28a) in response to said clutch (18, 18a) being in disengaged condition.

2. The brake protection interlock system as defined in claim 1 wherein said transmission (16, 16a) is shiftable between a neutral setting and at least one drive transmitting setting, wherein said first means (29, 29a) suppresses power production by said engine (12, 12a) in response to an inhibit signal, further including:

an inhibit signal generating circuit (24, 24a) connected to said first means (29, 29a) and having brake condition sensor means (26, 26a) for suppressing said inhibit signal when said brake (19, 19a) is disengaged, and wherein said second means (28, 28a) includes transmission setting sensor means for suppressing said inhibit signal when said transmission (16, 16a) is at said neutral setting.

3. The brake protection interlock system (23, 23a) as defined in claim 1 wherein said first means (29, 29a) suppresses power production by said engine (12, 12a) in response to an inhibit signal, further including:

an inhibit signal generating circuit (24, 24a) connected to said first means (29, 29a) and having brake condition sensor means (26, 26a) for suppressing said inhibit signal when said brake (19, 19a) is disengaged, and wherein said third means (27, 27a) includes clutch condition sensor means for suppressing said inhibit signal when said clutch (18, 18a) is in said disengaged condition.

4. The brake protection interlock system (23, 23a) as defined in claim 1 wherein said transmission (16, 16a) is shiftable between a neutral setting and at least one drive transmitting setting, wherein said first means (29, 29a) suppresses power production in said engine (12, 12a) in response to an inhibit signal, further including:

an inhibit signal circuit (24, 24a) connected to said first means (29, 29a) and having brake condition sensor means (26, 26a) for suppressing said inhibit signal when said brake (19, 19a) is disengaged, said second means including transmission setting sensor means for suppressing said inhibit signal when said transmission (16, 16a) is at said neutral setting, and said third means (27, 27a) including clutch condition sensor means for suppressing said inhibit signal when said clutch (18, 18a) is in said disengaged condition.

5. The brake protection interlock system (23, 23a) as defined in claim 1 wherein said vehicle (11, 11a) is provided with a source of electrical energy (31, 31a), said first means (29, 29a) being electrically controlled, said interlock system (23, 23a) including:

switch means (24, 24a) for actuating said first means (29, 29a) in response to an engaged condition of said brake (19, 19a) accompanied by an engaged condition of said clutch (18, 18a) and further accompanied by a drive condition in said transmission (16, 16a), said switch means (24, 24a) being connected between said source of electrical energy (31, 31a) and said first means (29, 29a).

6. The brake protection interlock system as defined in claim 5 wherein said switch means (24, 24a) includes:

a brake sensor switch (26, 26a) coupled to said brake (19, 19a) and having a first position when said brake (19, 19a) is engaged and a second position when said brake (19, 19a) is disengaged, a clutch sensor switch (27, 27a) coupled to said clutch (18, 18a) and having a first position when said clutch (18, 18a) is engaged and a second position when said clutch (18, 18a) is disengaged, and a transmission sensor switch (28, 28a) coupled to said transmission (16, 16a) and having a first position when said transmission (16, 16a) is in said drive condition and a second position when said transmission (16, 16a) is in said neutral condition.

7. The brake protection interlock system as defined in claim 6 wherein said first means (29) is actuated by receipt of an electrical signal and wherein said brake sensor switch (26) and said clutch sensor switch (27) and said transmission sensor switch (28) are connected between said source of electrical energy (31) and said first means (29) in series relationship, said first positions of each of said sensor switches (26, 27, 28) being closed switch positions and said second positions thereof being open switch positions.

8. The brake protection interlock system as defined in claim 6 wherein said first means (29a) is actuated by termination of an electrical control signal and wherein said brake sensor switch (26a) and said clutch sensor switch (27a) and said transmission sensor switch (28a) are connected between said source of electrical energy (31a) and said first means (29a) in parallel relationship, said first positions of each said sensor switches (26a, 27a, 28a) being open positions and said second positions thereof being closed positions.

9. The brake protection interlock system as defined in claim 1 wherein said engine (12a) has an electrical ignition circuit (29a) and a source of electrical energy (31a) therefor and wherein said interlock means (23a) includes means (24a) for disconnecting said ignition circuit from said source of electrical energy (31a) when said transmission (16) is in said drive transmitting condition while both of said brake (19a) and said clutch (18) are engaged.

10. A brake protection interlock system for a vehicle (11, 11a) having ground engaging means (13, 13a), a brake (19, 19a), an engine (12, 12a), and drive delivery means (14, 14a) for transmitting power from said engine (12, 12a) to said ground engaging means (13, 13a), wherein said engine (12) has adjustable fuel input means (41) for selectively varying the fuel input rate to said engine (12), said fuel input means (41) having a fuel control element (44) movable between a minimum fuel input setting and a maximum fuel input setting, said drive delivery means (14, 14a) having a transmission (16, 16a) with at least one nondrive transmitting condition and at least one drive transmitting condition and having a clutch (18, 18a) which may be engaged and disengaged, wherein the improvement comprises:

interlock means (23, 23a) for preventing initiation of powered travel of said vehicle (11, 11a) with said brake (19, 19a) engaged by suppressing power output from said engine (12, 12a) in response to said transmission (16, 16a) being in said drive transmitting condition while both of said brake (19, 19a) and said clutch (18, 18a) are engaged, and wherein said interlock means (23) includes means (24, 29, 48) for shifting said fuel control element (44) towards said minimum fuel input setting in response to said drive transmitting condition in said transmission (16) accompanied by an engaged condition of both said brake (19) and said clutch (18).

11. The brake protection interlock system as defined in claim 10 wherein said fuel input means is a carburetor (41) and said fuel control element (42) thereof operates a throttle valve (42) and is positionable by movement of an operator's control member (47), and wherein said interlock means (23) includes a disconnector (51) through which said control member (47) is coupled to said throttle valve (42), and means (48) biasing said throttle valve (42) towards said minimum fuel input setting, said interlock means (23) further including means (24, 63) for disengaging said disconnector (51) when said transmission (16) is in said drive transmitting condition at the same time that said brake (19) and said clutch (18) are both engaged.

12. A brake interlock (23, 23a) for a vehicle (11, 11a) which has ground engaging means (13, 13a), a brake (19, 19a), an engine (12, 12a) and a drive clutch (18, 18a) and transmission (16, 16a) for delivering power from the engine (12, 12a) to the ground engaging means (13, 13a), wherein the drive clutch (18, 18a) has an engaged condition and a disengaged condition and wherein the transmission (16, 16a) is shiftable between a neutral condition and at least one drive delivering condition, and first means (29, 29a) for preventing initiation of powered travel of said vehicle (11, 11a) with said brake (19, 19a) engaged by suppressing operation of said engine (12, 12a), the combination comprising:

brake condition sensor means (26, 26a) for detecting an engaged condition of said brake (19, 19a), transmission condition sensor means (28, 28a) for detecting a drive delivering condition in said transmission (16, 16a), and second means (24, 24a) for causing said first means (29, 29a) to suppress operation of said engine (12, 12a) when said sensor means (24, 24a) detect that said brake (19, 19a) is engaged while said transmission (16, 16a) is in said drive delivering condition and, clutch condition sensor means (27, 27a) for enabling starting of said engine (12, 12a) with said brake engaged and said transmission (16, 16a) in drive transmitting condition by inactivating said second means (24, 24a) when said clutch (18, 18a) is disengaged.

13. The combination defined in claim 12 wherein said engine (12a) includes an ignition circuit and a source of electrical energy (31a) therefor, constituting said means (29a) for preventing initiation of powered travel of said vehicle (11a) with said brake (19a) engaged by suppressing operation of said engine (12a) and wherein said second means (24a) disconnects said source of electrical energy (31a) from said ignition circuit (29a) in response to sensing of an engaged condition of said brake (19a) and said drive clutch (18a) accompanied by a drive delivering condition in said transmission (16a).

14. A brake interlock for a vehicle which has ground engaging means (13), a brake (19), an engine (12) and a drive clutch (18) and transmission (16) for delivering power from the engine (12) to the ground engaging means (13), wherein said engine (12) includes a carburetor (41) having a throttle valve (42) with resilient means (48) for biasing said throttle valve (42) toward an engine idle setting and having a control element (47) for shifting said throttle valve (42) away from said engine idle setting against the action of said resilient means (38), wherein the drive clutch (18) has an engaged condition and a disengaged condition and wherein the transmission (16) is shiftable between a neutral condition and at least one drive delivering condition, the combination comprising:

brake condition sensor means (26) for detecting an engaged condition of said brake (19), clutch condition sensor means (27) for detecting an engaged condition of said clutch (18), transmission condition sensor means (28) for detecting a drive delivering condition in said transmission (16), and means (29) for preventing initiation of powered travel of said vehicle (11) with said brake (19) engaged by suppressing operation of said engine (12) when said sensor means (24) detect that said brake (19) and said clutch (18) are both engaged while said transmission (16) is in said drive delivering condition, wherein said means (29) for suppressing operation of said engine (12) includes means (51) for temporarily disconnecting said control element (47) from said throttle valve (42) while said sensor means (24) detect an engaged condition of both said brake (19) and said drive clutch (18) accompanied by a drive delivering condition in said transmission (16).

* * * * *